United States Patent
Barnett

(10) Patent No.: US 7,214,108 B2
(45) Date of Patent: May 8, 2007

(54) SHEARABLE FASTENER

(75) Inventor: Gary Barnett, Leicestershire (GB)

(73) Assignee: Tyco Electronics UK Limited (GB)

( * ) Notice: Subject to any disclaimer, the term of this patent is extended or adjusted under 35 U.S.C. 154(b) by 53 days.

(21) Appl. No.: 10/503,002

(22) PCT Filed: Jan. 27, 2003

(86) PCT No.: PCT/GB03/00311

§ 371 (c)(1),
(2), (4) Date: Feb. 14, 2005

(87) PCT Pub. No.: WO03/067102

PCT Pub. Date: Aug. 14, 2003

(65) Prior Publication Data

US 2005/0130489 A1  Jun. 16, 2005

(30) Foreign Application Priority Data

Feb. 6, 2002 (GB) .................. 0202710.0

(51) Int. Cl.
*H01R 11/09* (2006.01)
(52) U.S. Cl. .................................... 439/797
(58) Field of Classification Search ........ 439/797, 439/813–814, 810–811, 416; 411/5, 307–309, 411/263
See application file for complete search history.

(56) References Cited

U.S. PATENT DOCUMENTS 3,876,279 A * 4/1975 Underwood ............... 439/797
3,901,066 A  8/1975 Orlomoski
4,199,216 A * 4/1980 Gryctko ................... 439/814
5,964,768 A 10/1999 Huchner
6,042,430 A * 3/2000 Hollick ..................... 439/797
6,699,062 B1 * 3/2004 Barnett et al. ............. 439/416

FOREIGN PATENT DOCUMENTS

DE    199 60 198 A1    6/2001
WO    WO 96/31706     10/1996

OTHER PUBLICATIONS

PCT International Search Report, International Application No. PCT/GB03/0311; filed Jan. 27, 2003; mailed May 26, 2003.
GB Search Report; Application No. GB 0202710.0; Date of Search: Jun. 11, 2002.

* cited by examiner

*Primary Examiner*—J. F. Duverne
(74) *Attorney, Agent, or Firm*—Myers Bigel Sibley & Sajovec

(57) ABSTRACT

A shearable fastener has a threaded shank adapted for engagement with a threaded bore and a head portion formed for engagement with a drive tool, the shank being formed with a series of axially separated weakenings defining a series of shear planes. The weakenings are formed such that the applied torque necessary to cause the shank to shear increases progressively from the shear plane furthest from the head portion to the shear plane nearest the head portion. The weakenings are holes, grooves or slits formed in the shank and the radius at the bottom of the holes, grooves or slits is varied to produce or contribute to the increase in shear torque.

22 Claims, 3 Drawing Sheets

SHEARABLE FASTENER

RELATED APPLICATIONS

The present application is a National Phase application of PCT/GB03/00311 filed on Jan. 27, 2003 and published in English, which claims priority from GB Application No. 0202710.0 filed on Feb. 6, 2002.

This invention relates to improvements in fasteners, in particular to improvements in shearable fasteners. Such fasteners are particularly suitable for securing electrical conductors to electrical connectors.

Electrical connectors are widely used for the joining of two or more electrical cables or conductors. One form of such connector comprises a body with blind bores into which the end of the conductors are inserted. Each conductor is fixed in place by threaded fasteners which are engaged with threaded bores in the wall of the blind bore and which hold the conductor against the opposite internal face of the bore. Commonly, such fasteners have shearable heads which break off at a certain predetermined applied torque. This prevents excessive, and possibly damaging, force being applied to the conductor and also results in the assembled joint having a reasonably smooth profile.

Known systems of the type described above suffer from the disadvantage, however, that because the conductors joined together using the connector may be of various different sizes, it is necessary for the shearable fasteners to be produced in a corresponding range of lengths in order to ensure that the assembled joint has the desired smooth profile. This means that a fitter must carry a suitable supply of all different sizes and can result in mistakes being made and inappropriate fasteners being used.

British Patent Application No. GB 2281599 describes a threaded fastener which, when applied using a special tool, is arranged to shear at an axial position along its length corresponding to the surface of an electrical connector with which it is engaged. However, such a fastener can only be used in conjunction with such a special tool.

European Patent Publication No. EP-A-0819222 (B&H005) describes an improved fastener which overcomes or substantially mitigates the above mentioned disadvantage, without the need for special tools, when used in an electrical connector comprising first and second connector parts between which an electrical conductor may be received, and a threaded fastener engageable with a threaded bore in the first connector part such that the fastener may engage the conductor, either directly or through an intermediate component, and secure the conductor against the second connector part, the fastener having a threaded shank adapted for engagement with a threaded bore and a head portion having drive formations for engagement with a drive tool, the shank being formed with axially separated weakenings defining a series of shear planes, wherein said drive formations are formed such that, in use, a series of said weakenings are incapable of being supported by the drive tool and the weakenings in said series are formed such that the applied torque necessary to cause the shank to shear increases progressively from the shear plane furthest from the head portion to the shear plane nearest the head portion.

SUMMARY OF THE INVENTION

In some embodiments of the present invention, shearable fasteners have a threaded shank adapted for engagement with a threaded bore and a head portion formed for engagement with a drive tool, the shank being formed with a series of axially separated weakenings defining a series of shear planes. The weakenings are formed such that the applied torque necessary to cause the shank to shear increases progressively from the shear plane furthest from the head portion to the shear plane nearest the head portion. The weakenings are holes, grooves or slits formed in the shank and the radius at the bottom of the holes, grooves or slits is varied to produce or contribute to the increase in shear torque.

In other embodiments of the present invention, electrical connectors include first and second connector parts between which an electrical conductor may be received and a threaded fastener engageable with a threaded bore in the first connector part such that the fastener may engage the conductor, either directly or through an intermediate component, and secure the conductor against the second connector part. The fastener has a threaded shank adapted for engagement with a threaded bore and a head portion having drive formations for engagement with a drive tool. The shank is formed with axially separated weakenings defining a series of sheer planes. The drive formations are formed such that, in use, a series of the weakenings are incapable of being supported by the drive tool and the weakenings in the series are formed such that the applied torque necessary to cause the shank to shear increases progressively from the shear plane furthest from the head portion to the shear plane nearest the head portion. The weakenings are holes, grooves or slits formed in the shank and the radius at the bottom of the holes, grooves or slits is varied to produce or contribute to the increase in shear torque.

DETAILED DESCRIPTION OF EMBODIMENTS OF THE INVENTION

Figure 1:
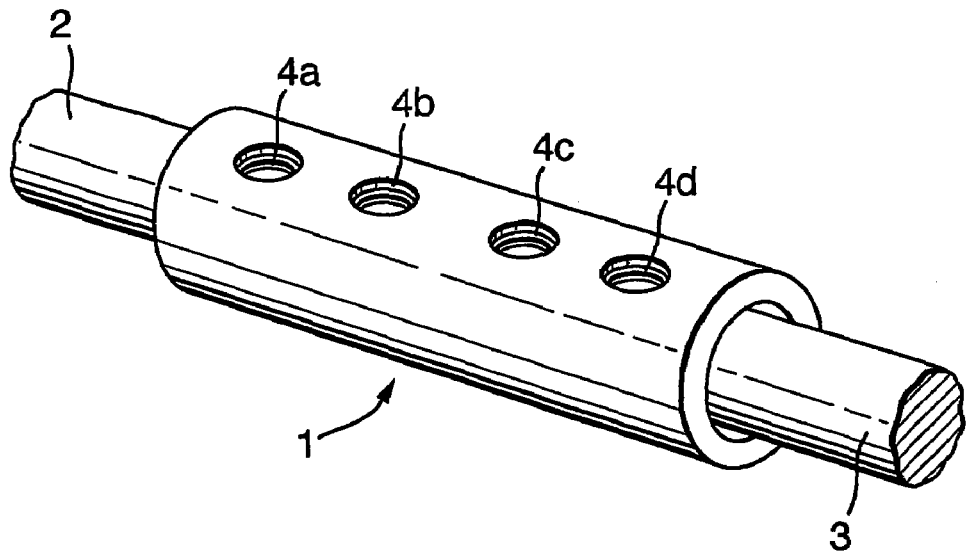
FIG. 1 is a perspective view of a first electrical connector for the end-to-end connection of two electrical conductors.
Figure 2:
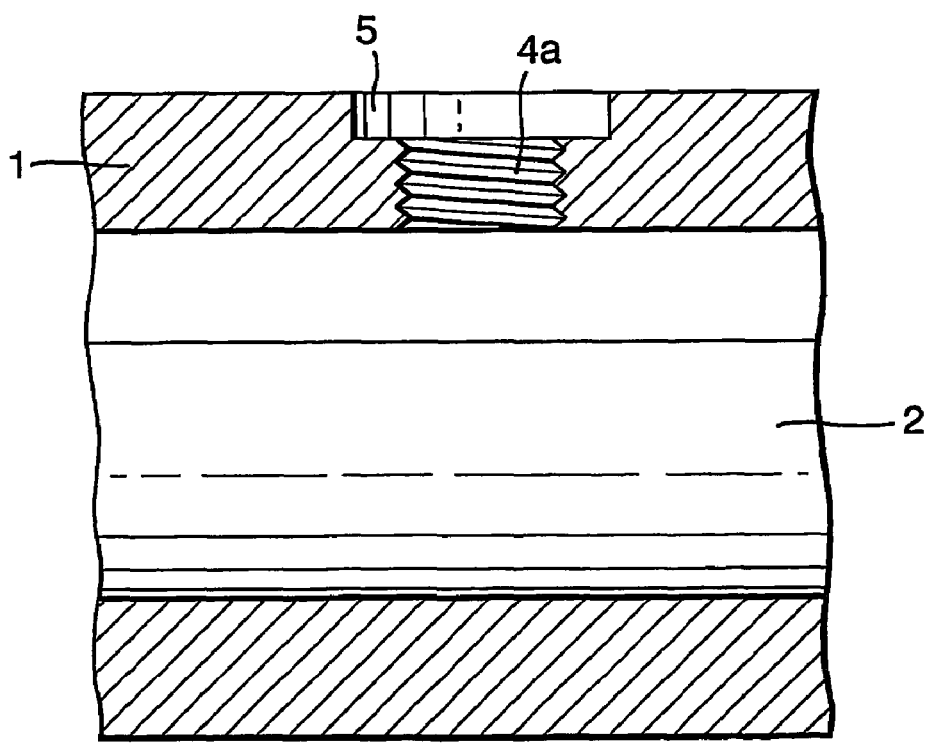
FIG. 2 is a sectional view of a portion of the connector of FIG. 1.

To facilitate understanding of the present invention, the known arrangement of EP-A-0819222 will be described with reference to FIGS. 1 to 5. Referring first to FIG. 1, an electrical connector comprises a generally cylindrical aluminium body 1. Blind bores extend from each end of the body 1 towards the middle, each bore receiving the end of the respective first and second conductors 2,3. Four threaded bores 4a–d are provided in the wall of body 1. The threaded bores 4a–d receive shearable threaded fasteners (not shown in FIG. 1) which engage the conductors 2,3 and hold them in position within the blind bores in the body 1. Fasteners passing through the threaded bores 4a,4b engage the first conductor 2 and fasteners passing through the threaded bores 4c, 4d engage the second conductor 3. The connector thus far described is entirely conventional. FIG. 2 shows a sectional view of the connector body 1 in the region of the threaded bore 4a. As can be seen, the upper portion of the bore 4a is provided with a countersink 5.

Figure 3:
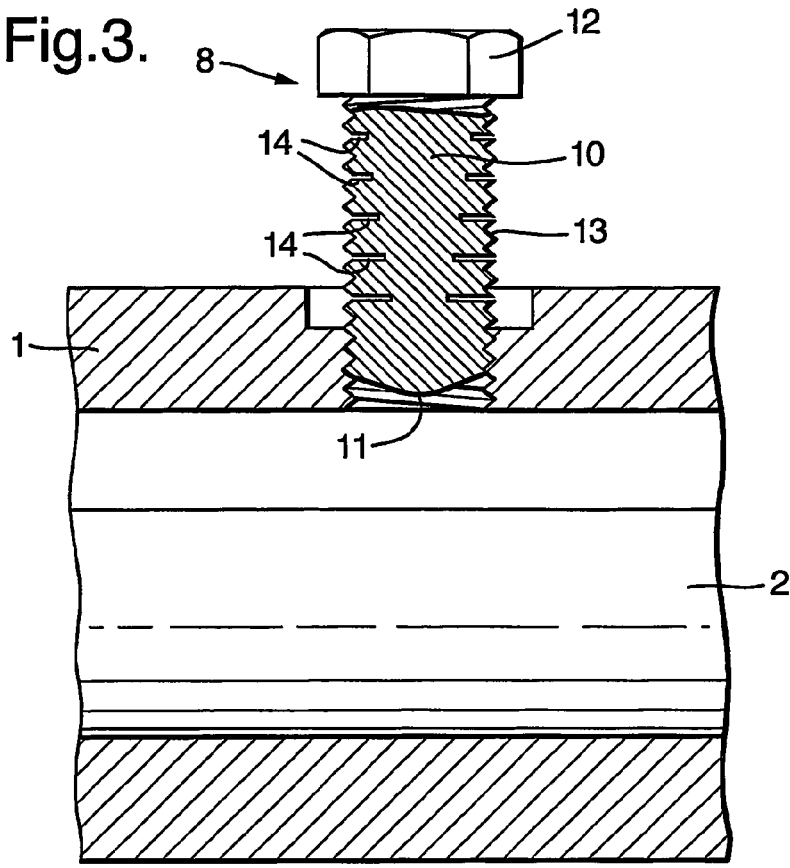
FIG. 3 shows the same portion of the connector of FIG. 1, with a shearable threaded fastener engaged with the connector.
Figure 4:
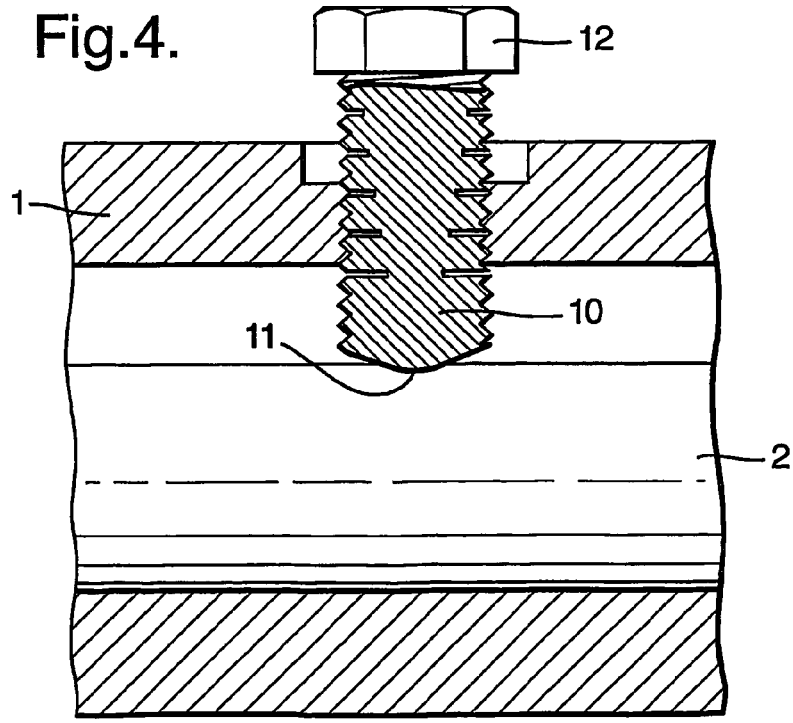
FIG. 4 is a view similar to FIG. 3, after sufficient rotations of the shearable fastener for it to engage a conductor within the connector.

In use, shearable threaded fasteners 8 (see FIG. 3) are engaged with the threaded bore 4a, and with the other three threaded bores 4b–d. As shown in FIG. 3, the fastener 8 has a generally cylindrical shank 10 with a tip 11 formed into an obtuse point. The fastener 8 has a head 12 of hexagonal cross section. The cylindrical outer surface of the shank 10 is formed with a screw thread 13 and, superimposed on the thread, a series of spaced apart circumferential slits 14 which extend radially into the shank 10. The slits 14 are arranged and disposed to cause shearing of the shank 10 upon application of certain predetermined torques. The depth of the slits 14 decreases progressively from the tip 11 of the fastener 8 towards the head 12, such that the torque necessary to cause shearing of the shank 10 increases with distance from the tip 11.

The fastener 8 is engaged with the threaded bore 4a using a conventional drive tool such as a socket wrench which engages the head 12. For clarity, the drive tool is not shown in the drawings. The fastener 8 is rotated until its tip 11 engages the conductor 2 (see FIGS. 3 and 4).

Figure 5:
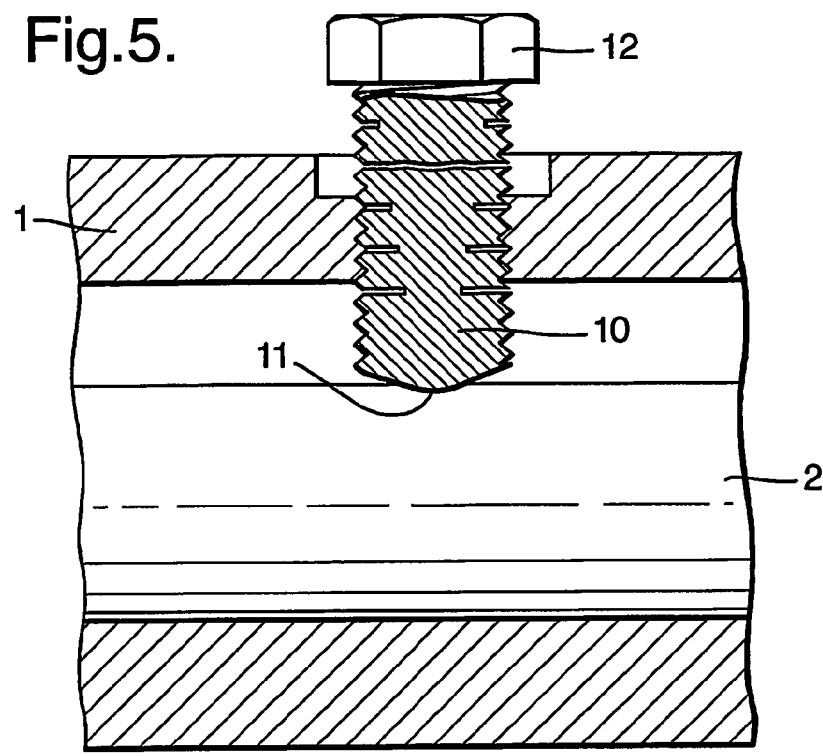
FIG. 5 illustrates shearing of the shearable fastener following continued application of torque to the fastener.

Continued application of torque to the fastener 8 causes the fastener 8 to shear, as shown in FIG. 5. Because the lower portions of the fastener 8 are supported externally by the walls of the threaded bore 41, and because the applied torque necessary to cause shearing increases with distance from the tip 11, the shank 10 shears preferentially at the first slit 14 which is external to the threaded bore 4a. This slit will generally be in the countersink 5 of the bore 4a. Occasionally, however, the fastener may shear at slit 14 located just internal to the threaded bore 4a. After shearing of the fastener 8, the remaining lower portion of the fastener 8 holds the conductor 2 securely in place.

In the case of a conductor of larger diameter than that shown in the drawings, the fastener 8 would extend a shorter distance into the connector bore before engaging the conductor. In this case, shearing would take place at a slit 14 nearer the tip 11 of the fastener 8. Because smaller conductors are less robust than larger conductors, it may be desirable for a lesser securing force to be applied to such a conductor. For this reason, the depth of the thread 13 is reduced slightly towards the head 12. This increases the frictional back-loading as the fastener 8 is progressively In that known arrangement, the weakenings in the fastener shank preferably comprise holes, grooves or slits formed in the side of the fastener. The progressive variation in the applied torque necessary to cause shearing can be achieved by control of the dimensions (width, depth) of the holes, grooves or slits constituting the weakenings. In a particularly preferred embodiment, the weakenings in the shank comprise a series of axially separated annular grooves. The depth of the grooves decreases from that nearest the tip of the shank to that nearest the head portion. In this arrangement, in the successive shear planes defined by the grooves, the effective diameter of the shank increases progressively from the tip of the shank to the head portion. Hence, the applied torque necessary to cause shearing increases from the tip of the shank to the head portion.

In contrast with the known arrangement described in the aforementioned EP-A-0819222, the entire disclosure of which is incorporated herein by reference, the present invention achieves the progressive variation in the applied torque necessary to cause shearing by varying the radius at the bottom of each weakening hole, groove, or slit from that nearest the tip of the fastener shank to that nearest the head portion.

The radii may for example increase from very small or substantially zero in the hole, groove or slit nearest the tip, thus concentrating the shear force in a relatively thin planar cross-section of the shank, to progressively wider radii distributing the shear force over a thicker cross section, thus requiring application of greater torque to cause shearing.

This radius-controlled progression of the shear force according to the present invention may be used in combination with the depth-controlled progression of the aforementioned known arrangement. Alternatively, the radius-controlled progression of the shear force according to the present invention may be used alone in fasteners having substantially the same depth and shank diameter at each of the holes, grooves or slits forming the weakenings in the fastener shank.

Figure 6:
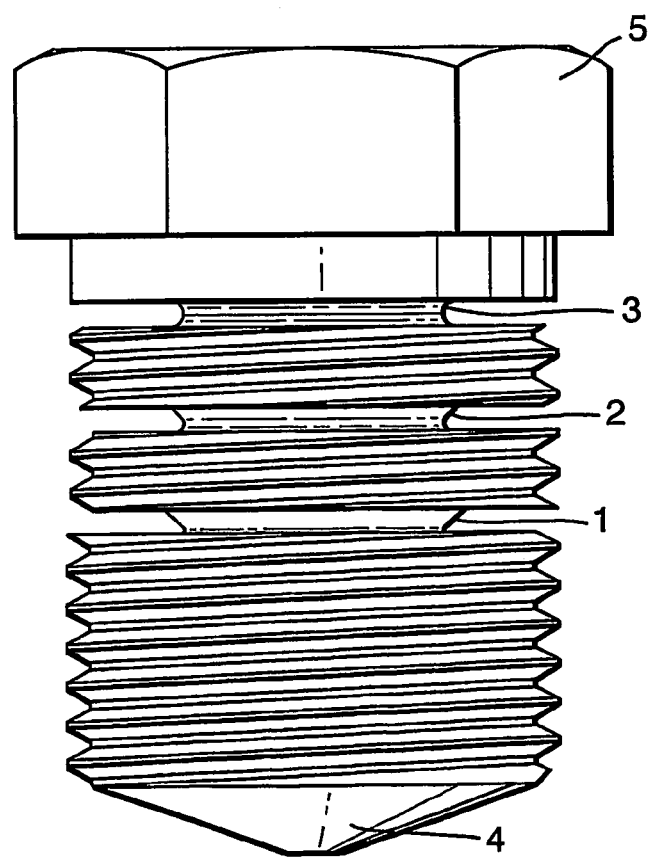
FIG. 6 shows the new shearable fastener according to some embodiments of the present invention.

One such fastener is shown by way of example in FIG. 6 of the accompanying drawings, wherein the weakening grooves 1, 2 and 3 have substantially identical depth and width. The bottom of groove 1, nearest the tip 4 of the fastener, has a sharp profile approaching zero radius, while groove 3, nearest the head 5 of the fastener, has a noticeably greater, rounded radius, and groove 2 has an intermediate radius between that of the other two grooves. This progressive increase in radius from the groove nearest the tip to that nearest the head has the result that the applied torque necessary to cause the fastener to shear increases progressively from the shear plane furthest from the head (groove 1) to the shear plane nearest to the head (groove 3).

This radius-controlled progression of shear torque can be used alone satisfactorily for fasteners having three or four shear planes, but may become difficult to machine accurately enough to control the torque progression if five or more shear plane grooves are desired. In that case, combination with, and/or replacement by, some form of depth-controlled shear torque progression may be preferable. For example, it may be practicable to use grooves of different depths also having different radii, or to use some grooves of matching depths having different radii in combination with some grooves of different depths having matching radii. In one practical embodiment, the fastener is of brass and has a shank of nominal diameter 18 mm. The fastener has an overall length of 41 mm, the lowermost slit being 12.25 mm from the tip of the fastener. The slits are separated axially at 3.75 mm centres and are all 0.75 mm wide.

The slits all have a depth of approximately 5 mm such that in the plane defined by each slit the shank has an effective diameter of approximately 8 mm. The shank is found to shear in that plane at an applied torque of approximately 35–41 N.m (26–30 ft.lbs when the slit furthest from the head (nearest the tip) has a sharp point or substantially zero radius at its bottom. The succeeding slits have bottom radii which are successively increased leading to an increase in the torque at which the shank will shear by approximately 2.7 N.m (2 ft.lbs) from one shear plane to the next.

When the fastener of this invention is used in the aforementioned connectors, the first connector part and the second connector part may be separate components held in fixed relation, or may be formed integrally, eg as opposite sides of a tubular socket into which the conductor is inserted.

The fastener may bear directly on the conductor. Alternatively, the fastener may drive one or more intermediate components, eg, a pressure plate or an insulation piercing member, into engagement with the conductor.

The connector may contain a plurality of sockets for the connection together of a corresponding number of conductors (eg two or three conductors). Alternatively, the connector may have only a single socket and be for the connection of a single conductor to some other component. In a further alternative, a socket may receive more than one conductor.

Each conductor may be secured by a single fastener or by more than one, eg two, fasteners. Where there is more than one fastener, the threaded bores for the fasteners may be parallel and adjacent, or may have some other arrangement. For example, where the first and second connector part are opposite sides of a socket, each side may have one or more threaded bores for fasteners which secure the conductor to the opposite side of the socket.

The external surface of the connector may be curved or flat, but in either case the threaded bore is preferably countersunk, such that shearing preferentially takes place at a point below the outer surface of the connector. The spacing of the weakenings on the fastener shank is preferably such that at least one weakening is positioned within the countersink whenever the fastener engages a conductor.

In principle, any form of drive means may be used to rotate the fastener, but preferably the head portion of the fastener may have a head of non-circular form, eg a square or hexagonal head, such that positive drive may be transmitted to the fastener using a suitable tool such as a socket wrench. Alternatively, the head portion of the fastener may be formed with a bore or recess, eg of hexagonal or square section, with which an Allen (RTM) key or the like may be engaged. In such a case the bore or recess need not extend far along the axis of the fastener. However, if the bore or recess does extend a substantial distance along the axis of the fastener, the drive tool should not extend into the recess or bore so far that it supports internally any of the weakenings which define the shear planes.

The variations described in the aforementioned EP-A-0819222 may be used with the present invention, as reflected in the following claims.

The invention claimed is:

1. A shearable fastener comprising a threaded shank adapted for engagement with a threaded bore and a head portion formed for engagement with a drive tool, the shank being formed with a series of axially separated weakenings defining a series of shear planes, wherein the weakenings are formed such that the applied torque necessary to cause the shank to shear increases progressively from the shear plane furthest from the head portion to the shear plane nearest the head portion, wherein the weakenings comprise holes, grooves or slits formed in the shank and a radius at a bottom of the holes, grooves or slits is varied to contribute to the increase in the applied torque necessary to cause the shank to shear.

2. An electrical connector comprising first and second connector parts configured to receive therebetween an electrical conductor, and a threaded fastener engageable with a threaded bore in the first connector part such that the fastener may engage the conductor, either directly or through an intermediate component, and secure the conductor against the second connector part, the fastener having a threaded shank adapted for engagement with a threaded bore and a head portion having drive formations for engagement with a drive tool, the shank being formed with axially separated weakenings defining a series of sheer planes, wherein said drive formations are formed such that, in use, a series of said weakenings are incapable of being supported by the drive tool and the weakenings in said series are formed such that the applied torque necessary to cause the shank to shear increases progressively from the shear plane furthest from the head portion to the shear plane nearest the head portion, wherein the weakenings comprise holes, grooves or slits formed in the shank and a radius at the bottom of the holes, grooves or slits is varied to contribute to the increase in the applied torque necessary to cause the shank to shear.

3. A fastener as claimed in claim 1, wherein the weakenings comprise annular grooves, a depth of the grooves being substantially the same from that furthest from the head portion to that nearest the head portion.

4. A fastener as claimed in claim 1, wherein the fastener is formed such that a frictional back-loading between the shank and a threaded bore with which it is engaged increases the further the shank is engaged with the threaded bore.

5. A fastener as claimed in claim 4, wherein the depth of the thread of the threaded shank is progressively reduced as the thread approaches the head portion.

6. A fastener as claimed in claim 4, wherein the thread of the threaded shank is imperfectly formed in a region close to the head portion.

7. A fastener as claimed in claim 1, wherein the head portion is of non-circular cross-section.

8. A fastener as claimed in claim 7, wherein the head portion is of square or hexagonal cross-section.

9. A fastener as claimed in claim 1, wherein the head portion is formed with a recess of non-circular cross-section.

10. A fastener as claimed in claim 1, wherein one or more transverse bores or recesses is provided for engagement with the drive tool.

11. A connector as claimed in claim 2, wherein a plurality of threaded bores are provided for a corresponding number of the threaded fasteners to engage the conductor.

12. A connector as claimed in claim 2, wherein the first connector part and the second connector part are separate components held in fixed relation.

13. A connector as claimed in claim 2, wherein the first connector part and the second connector part are formed integrally.

14. connector as claimed in claim 2, wherein the fastener in use bears directly on the conductor.

15. A connector as claimed in claim 2, wherein the fastener in use drives one or more intermediate components into engagement with the conductor.

16. A connector as claimed in claim 2, which comprises a plurality of sockets for the connection of a corresponding number of conductors.

17. A connector as claimed in claim 2, which comprises a single socket.

18. A connector as claimed in claim 2, wherein the threaded bore is countersunk.

19. A shearable fastener comprising:
a threaded shank configured for engagement with a threaded bore;
a head portion on an end of the shank that is configured for engagement with a drive tool; and
a plurality of axially separated weakenings extending along the shank and defining a series of shear planes therein, a radius at a bottom of respective ones of the weakenings being different from other of the weakenings to provide a different needed applied torque to shear the shank in the corresponding shear planes.

20. The fastener of claim 19 wherein the radius of respective ones of the weakenings are selected so that the applied torque to cause the shank to shear increases progressively from one of the shear planes furthest from the head portion to one of the shear planes nearest the head portion.

21. The fastener of claim 20 wherein the weakenings comprise annular grooves and wherein a depth of each of the weakenings is substantially the same.

22. A connector including the fastener of claim 20.

* * * * *